United States Patent
Yamaguchi

(10) Patent No.: US 7,548,260 B2
(45) Date of Patent: Jun. 16, 2009

(54) IDENTIFICATION PHOTO SYSTEM AND IMAGE PROCESSING METHOD WHICH AUTOMATICALLY CORRECTS IMAGE DATA OF A PERSON IN AN IDENTIFICATION PHOTO

(75) Inventor: Yoshihiro Yamaguchi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 658 days.

(21) Appl. No.: 09/741,048

(22) Filed: Dec. 21, 2000

(65) Prior Publication Data
US 2001/0005222 A1 Jun. 28, 2001

(30) Foreign Application Priority Data
Dec. 24, 1999 (JP) .................... 11-367598

(51) Int. Cl.
*H04N 5/262* (2006.01)
(52) U.S. Cl. .................... 348/239; 348/580
(58) Field of Classification Search .......... 382/118, 382/115, 190, 203, 266; 348/584, 580, 581, 348/655, 61, 585, 586, 223.1, 222.1, 207.2, 348/578, 207.1, 207.11; 358/518; 283/75, 283/70, 72, 73
See application file for complete search history.

(56) References Cited

U.S. PATENT DOCUMENTS

| | | | | |
|---|---|---|---|---|
| 5,208,661 A | * | 5/1993 | Jaspers | 348/254 |
| 5,296,945 A | * | 3/1994 | Nishikawa et al. | 358/518 |
| 5,309,228 A | * | 5/1994 | Nakamura | 358/500 |
| 5,345,313 A | * | 9/1994 | Blank | 348/598 |
| 5,412,487 A | * | 5/1995 | Nishimura et al. | 358/452 |
| 5,528,339 A | * | 6/1996 | Buhr et al. | 355/32 |
| 5,680,528 A | * | 10/1997 | Korszun | 345/630 |
| 5,835,641 A | | 11/1998 | Sotoda et al. | |
| 5,913,542 A | * | 6/1999 | Belucci et al. | 283/75 |
| 5,914,748 A | * | 6/1999 | Parulski et al. | 348/239 |
| 5,937,081 A | * | 8/1999 | O'Brill et al. | 382/111 |
| 6,023,524 A | * | 2/2000 | Yamaguchi | 382/162 |
| 6,035,074 A | * | 3/2000 | Fujimoto et al. | 382/282 |
| 6,067,377 A | * | 5/2000 | Hata | 382/167 |

(Continued)

FOREIGN PATENT DOCUMENTS

JP 5-68262 A 3/1993

(Continued)

OTHER PUBLICATIONS

English Translation of JP 06-123917 A.*

*Primary Examiner*—Lin Ye
*Assistant Examiner*—Nelson D Hernández
(74) *Attorney, Agent, or Firm*—Birch, Stewart, Kolasch & Birch, LLP

(57) ABSTRACT

An automatic correcting device of an identification photo system comprises a skin pigmentation area abstracting device that abstracts a skin pigmentation area from an image of a person, a skin pigmentation correction value calculating device that calculates skin pigmentation correction values according to colors of the skin pigmentation area abstracted by the skin pigmentation area abstracting device and a predetermined skin pigmentation correction target value, and a color correcting device that corrects colors of the skin pigmentation area according to the skin pigmentation correction values calculated by the skin pigmentation correction value calculating device. Thus, the skin pigmentation of the person in the photo can be corrected to the person's true pigmentation.

7 Claims, 12 Drawing Sheets

U.S. PATENT DOCUMENTS

| | | | | |
|---|---|---|---|---|
| 6,128,398 | A * | 10/2000 | Kuperstein et al. | 382/118 |
| 6,172,706 | B1 | 1/2001 | Tatsumi | |
| 6,173,069 | B1 * | 1/2001 | Daly et al. | 382/118 |
| 6,266,129 | B1 * | 7/2001 | Uzawa et al. | 355/40 |
| 6,298,197 | B1 * | 10/2001 | Wain et al. | 396/2 |
| 6,333,993 | B1 * | 12/2001 | Sakamoto | 382/173 |
| 6,396,599 | B1 * | 5/2002 | Patton et al. | 358/1.9 |
| 6,459,500 | B1 | 10/2002 | Takaoka et al. | |
| 6,636,332 | B1 * | 10/2003 | Soscia | 358/401 |
| 6,636,635 | B2 * | 10/2003 | Matsugu | 382/218 |
| 6,661,907 | B2 * | 12/2003 | Ho et al. | 382/118 |
| 6,678,407 | B1 * | 1/2004 | Tajima | 382/167 |
| 6,987,535 | B1 * | 1/2006 | Matsugu et al. | 348/239 |
| 6,999,113 | B1 * | 2/2006 | Omura | 348/207.2 |
| 2001/0004810 | A1 * | 6/2001 | Tasaki | 40/1 |
| 2001/0043727 | A1 * | 11/2001 | Cooper | 382/118 |
| 2002/0080251 | A1 * | 6/2002 | Moriwaki | 348/232 |
| 2002/0105662 | A1 * | 8/2002 | Patton et al. | 358/1.9 |
| 2003/0179911 | A1 * | 9/2003 | Ho et al. | 382/118 |

FOREIGN PATENT DOCUMENTS

| | | | |
|---|---|---|---|
| JP | 06067301 | A | 3/1994 |
| JP | 06123917 | A * | 5/1994 |
| JP | 06-233179 | A1 | 8/1994 |
| JP | 07303250 | A | 1/1995 |
| JP | 07154736 | A | 6/1995 |
| JP | 10-222649 | A | 8/1998 |
| JP | 118820 | | 1/1999 |
| JP | 11-250221 | A | 9/1999 |
| JP | 11-317863 | A | 11/1999 |
| JP | 2000261650 | A * | 9/2000 |

* cited by examiner

F I G. 5
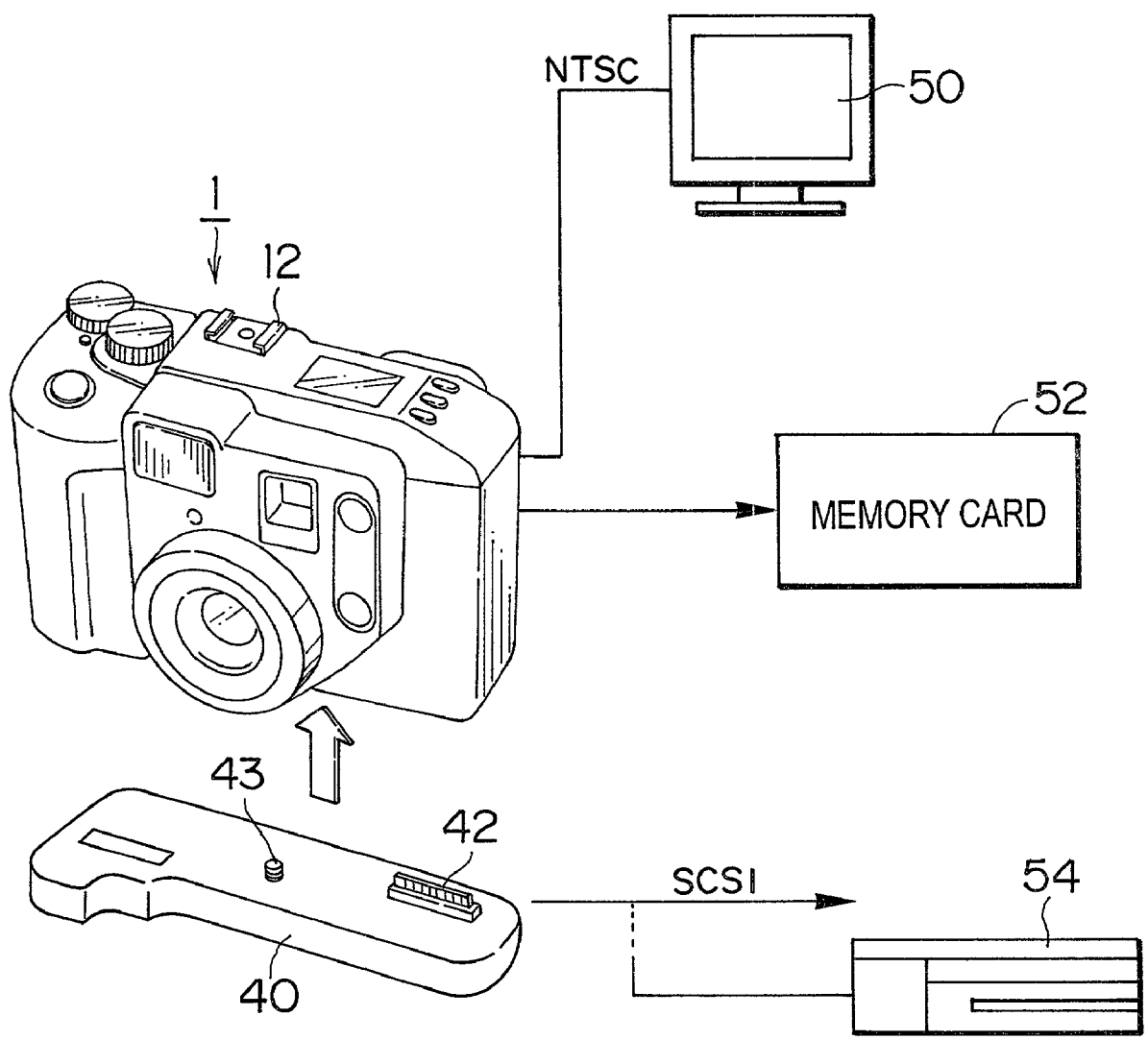

VISA: 50 by 50mm

PASSPORT: 45 by 35mm

DRIVER'S LICENSE: 30 by 24mm

BUSINESS CARD: 26 by 19mm

F I G. 7
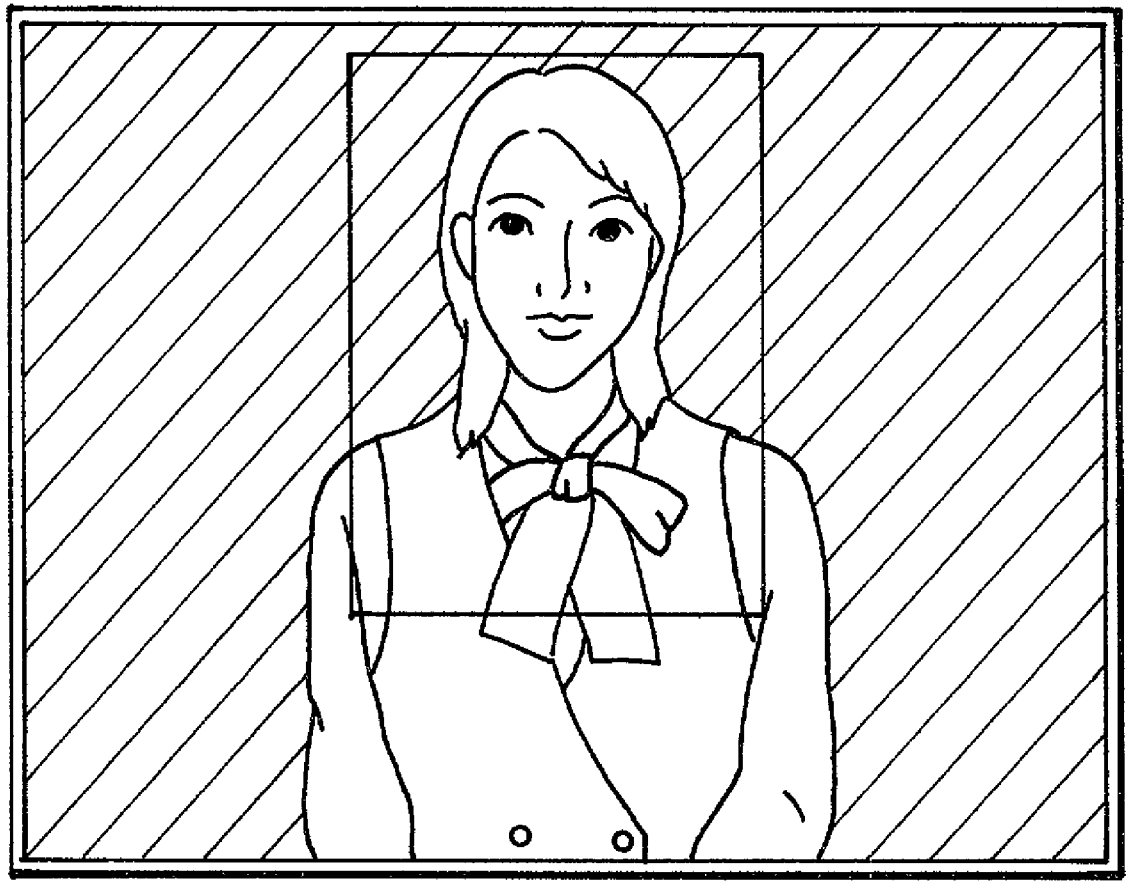

F I G. 8

| TEM | OPERATION | LCD PANEL DISPLAY |
|---|---|---|
| SIZE SWITCHING | SIZE SWITCHING ON SIZE A | 2-A |
| | SIZE SWITCHING ON SIZE B | 2-b |
| | SIZE SWITCHING ON SIZE C | 2-c |
| | SIZE SWITCHING ON SIZE D | 2-d |

IDENTIFICATION PHOTO SYSTEM AND IMAGE PROCESSING METHOD WHICH AUTOMATICALLY CORRECTS IMAGE DATA OF A PERSON IN AN IDENTIFICATION PHOTO

BACKGROUND OF THE INVENTION

1. Field of the Invention

This invention relates generally to an identification photo system and an image processing method. More particularly, this invention relates to an identification photo system that automatically corrects brightness of an image and adjusts colors and densities of the image and an image processing method.

2. Description of Related Art

Japanese Patent Provisional Publication No. 6-67301 discloses a photo taking apparatus that has a head size measuring part and a head position determining part in a shooting room. The photo taking apparatus warns with a buzzer if the head of a person is not at a predetermined position for an identification photo, and it turns on a lamp when the head of the person is at the predetermined position. Japanese Patent Provisional Publication No. 7-154736 discloses an identification photo taking apparatus that prints an image selected from sequentially-captured images as an identification photo.

Japanese Patent Provisional Publication No. 11-8820 discloses a digital identification photo system that displays an indicator formed according to the position and size of a head with an animation. The user takes an identification photo by setting the indicator with the head. Japanese Patent Provisional Publication No. 7-303250 discloses an identification photo taking apparatus that finds the difference between the size of a person area in a captured image and a predetermined size and enlarges or reduces the image until the difference becomes smaller than a threshold.

Japanese Patent Provisional Publication No. 6-233179 discloses an identification photo taking apparatus with a sensor that determines whether or not a person is at a shooting position. The identification photo taking apparatus adjusts diaphragm and color balance when the person is not at the shooting position, and it performs a shooting when the person is at the shooting position.

In the apparatuses disclosed in Japanese Patent Provisional Publication Nos. 6-67301, 7-154736, 11-8820 and 7-303250, the position of the person is adjusted according to the type of the identification photo, and the position and size of the person in the image are adjusted, and the best image is selected. However, the quality of the identification photo is low.

The apparatus disclosed in Japanese Patent Provisional Publication No. 6-233179 adjusts the diaphragm and the color balance to adjust illumination and exposure without the person. The exposure (diaphragm, shutter speed and color balance) needs to be set or adjusted with the illumination being fixed.

SUMMARY OF THE INVENTION

It is therefore an object of the present invention to provide an identification photo system that can correct colors and densities of image of a person so that skin pigmentation of the person in a photo is the person's true pigmentation, and change colors and densities of a background to desired colors and densities, and change the size of the image to that of an identification photo, and an image processing method.

The above object can be accomplished by providing an identification photo system that obtains image data for an identification photo of a person from image data of the person, the identification photo system comprising an automatic correcting device that automatically corrects the image data of the person.

The identification photo system according to the present invention comprises the automatic correcting device that automatically corrects the image data of the person. Thus, the skin pigmentation of the person in the photo can be corrected to the person's true pigmentation.

The automatic correcting device comprises a skin pigmentation area abstracting device that abstracts a skin pigmentation area from the image, a skin pigmentation correction value calculating device that calculates skin pigmentation correction values according to colors of the skin pigmentation area abstracted by the skin pigmentation area abstracting device and a predetermined skin pigmentation correction target value, and a color correcting device that corrects the colors of the skin pigmentation area according to the skin pigmentation correction values calculated by the skin pigmentation correction value calculating device. Thus, the skin pigmentation of the person in the photo can be corrected to the person's true pigmentation.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a diagram showing the electronic camera in FIG. 1 and apparatuses attached to the electronic camera 1;

FIG. 7 is a diagram showing the frame for a passport displayed with an image on the monitor;

FIG. 8 is a diagram showing display of a liquid crystal panel in accordance with the operation of a size switch button;

DETAILED DESCRIPTION OF THE PREFERRED EMBODIMENT

This invention will be described in further detail by way of example with reference to the accompanying drawings.

Figure 1:
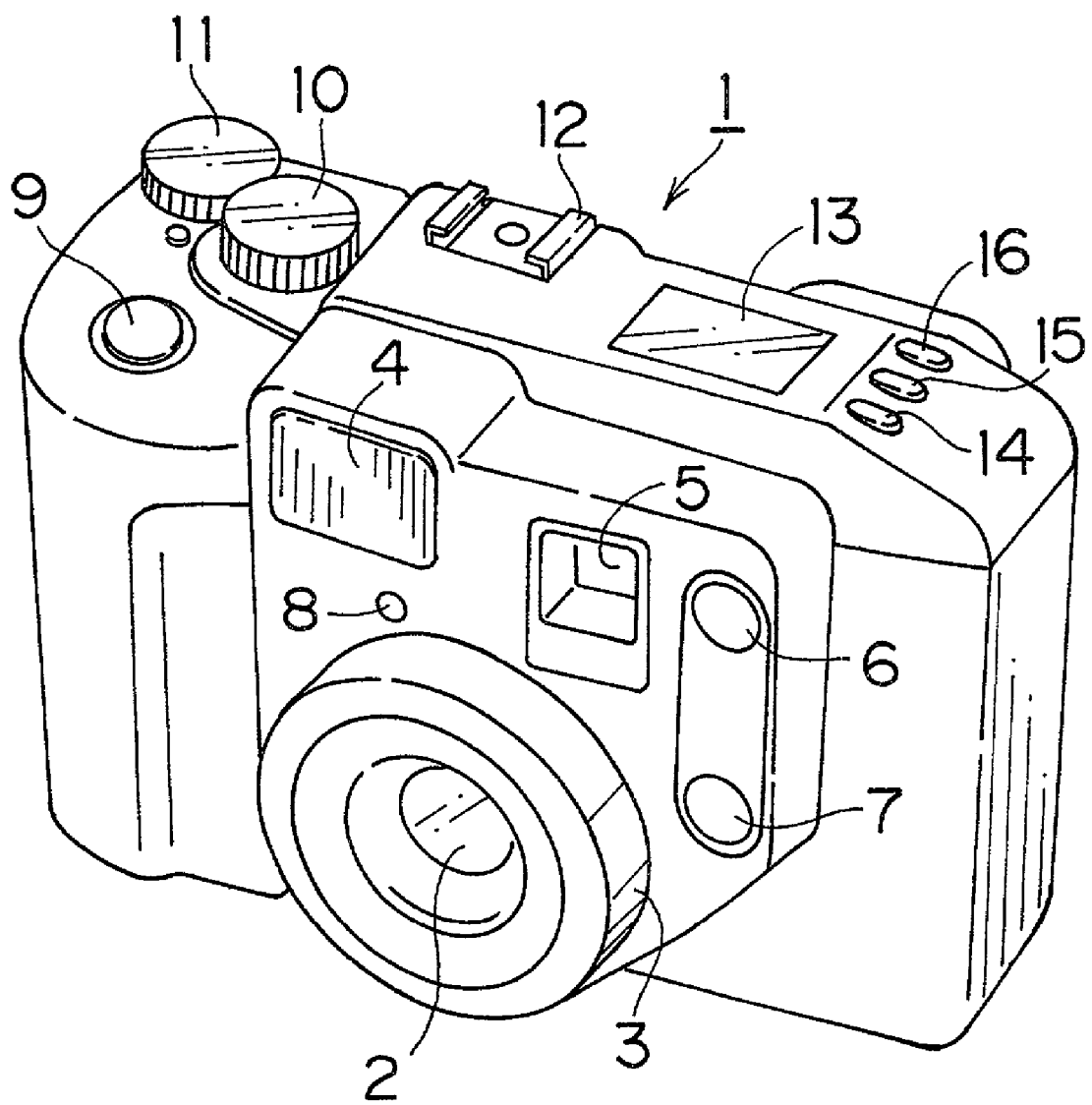
FIG. 1 is a perspective view showing an appearance of an electronic camera.

FIG. 1 is a perspective view showing an appearance of an electronic camera 1 for taking an identification photo.

A lens barrel 3 with a taking lens 2 is attached to the center of the front of the electronic camera 1, and an electronic flash window 4 and a viewfinder window 5 are formed above the taking lens 2. An automatic focusing (AF) light-emitting window 6 and an AF light-receiving window 7 are vertically arranged on the right side of the viewfinder window 5. The reference numeral 8 denotes an electronic flash light-adjusting sensor.

The taking lens 2 is a zooming lens, which is moved by a motor (not shown) driven according to an operation of a zoom lever 20 (see FIG. 2) provided on the back of the electronic camera 1 or an instruction of a CPU controlling the electronic camera 1 to adjust the focal length within the range between 9.2 and 25.8 mm (corresponding to the range between 35 and 105 mm in a 35 mm camera). A movable lens group composing objective lenses is arranged inside the viewfinder window 5, and a zoom finder that moves the movable lenses according to the focal length of the taking lens 2 is constructed inside the viewfinder window 5. An electronic zooming with the zooming ratio of 2 is performed when the camera is in the double mode, and thus the zooming ratio of the combination of the optical zooming and the electronic zooming is 6.

A light-emitting device such as an infrared light-emitting diode is provided inside the AF light-emitting window 6, and a light-receiving device with a photocell such as a photo diode is provided inside the AF light-receiving window 7. The light-emitting device and the light-receiving device compose a focusing part, which determines the subject distance in the triangulation or the like for the AF.

A shutter release button 9, a mode dial 10, an up/down dial 11, an accessory shoe 12 and a liquid crystal panel 13 are arranged on the top of the electronic camera 1, and a size switch button 14, an erasure button 15 and a print button 16 are arranged on the left side of the liquid crystal panel 13.

The mode dial 10 can be rotated in both directions to change the function of the electronic camera 1. For example, the mode is sequentially switched to nine mode s of "OFF," "AUTO," "SETUP," "P," "S," "A," "M," "PC" and "PLAY" in that order as the mode dial 10 rotates, and then the mode returns to the "OFF" when the mode dial 10 makes one rotation.

The electronic camera 1 is set to the "OFF" mode when the electronic camera 1 is not to be used, and the power of the electronic camera 1 is turned OFF in the "OFF" mode. The electronic camera 1 is set to the "AUTO" mode when an automatic shooting is to be performed, and the AF and the automatic exposure (AE) are performed in the "AUTO" mode to make it possible for the user to shoot only by pushing the shutter release button 9. The electronic camera 1 is set to the "SETUP" mode when a date, a time, a sensitivity compensation, a compressing mode, color or black and white, and the like are to be set, and the user operates the up/down dial 11 and a setting button 23 (see FIG. 2) while looking at the liquid crystal panel 13 to set the items in the "SETUP" mode.

The electronic camera 1 is set to the "P," "S," "A," and "M" modes when a programmed AE, a shutter speed-priority AE, an aperture-priority AE and a manual exposure, respectively. The user operates the up/down dial 11 and the setting button 23 to select a program and set the shutter speed, the aperture and so on in the modes.

The electronic camera 1 is set to the "PC" mode when image data is to be transmitted from the electronic camera 1 to a personal computer or an image processing device connected to the electronic camera 1 through a private cable or in the other way around. The electronic camera 1 is set to the "PLAY" mode when a shot image is to be reproduced.

Each time the size switch button 14 is pressed, a size of an identification photo is switched. The erasure button 15 is pressed when image data stored in a memory card is to be erased. The liquid crystal panel 13 displays the selected print size, the states of the switches, the remaining amount of a battery, the state of the memory, and so on.

Figure 2:
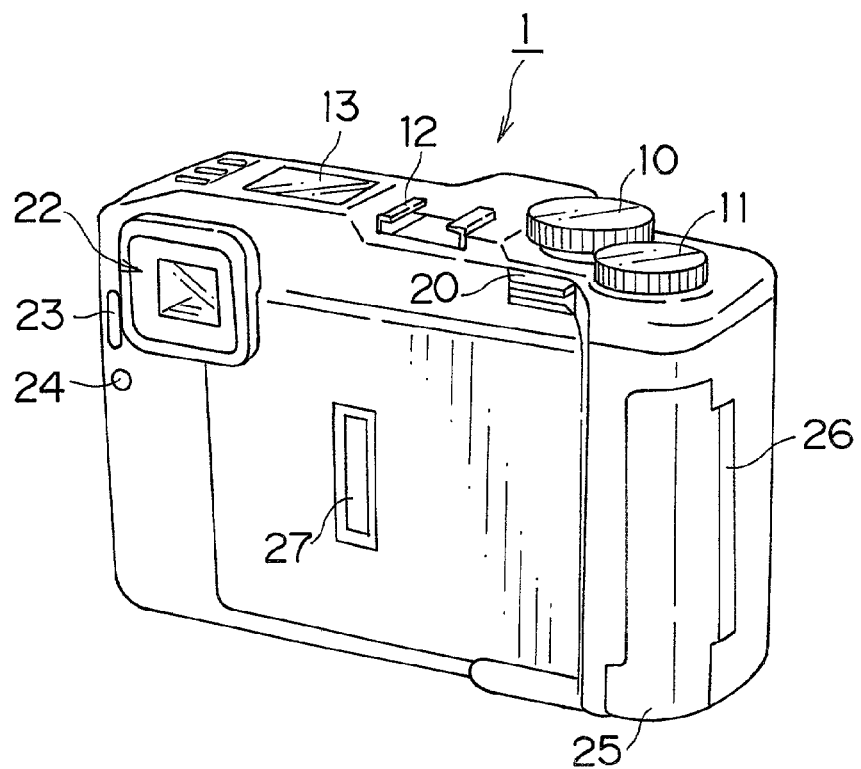
FIG. 2 is a perspective view showing the back of the electronic camera in FIG. 1.

FIG. 2 is a perspective view showing the back of the electronic camera 1 in FIG. 1. The zoom lever 20 is provided on the back of the electronic camera 1. When the user moves the zoom lever 20 upward and downward, the taking lens 2 is set to a telephoto lens and a wide-angle lens, respectively. An eyepiece 22 is provided at the upper left of the back of the electronic camera 1.

The setting button 23 and a scene number switch button 24 are arranged on the left side of the eyepiece 22. The setting button 23 is pressed to set the items with the up/down dial 11 as described above. Each time the scene number switch button 24 is pressed, the scene number of the print is switched between 1 and 2.

A memory card cover 25 is provided on the right side of the electronic camera 1 through a hinge 26 in such a manner as to open and close. A chamber for the memory card is formed inside the electronic camera 1, and the memory card can be loaded in and taken out of the electronic camera 1 while the memory card cover 25 is open. A transparent window 27 is provided on the back of the electronic camera 1 so that the user can confirm whether or not the memory card is in the electronic camera 1 through the window 27.

Figure 3:
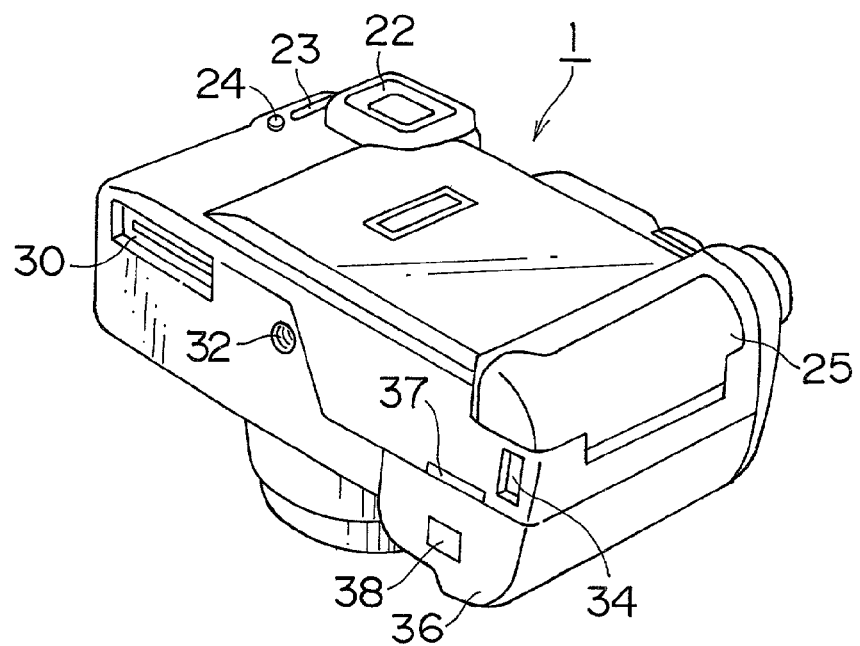
FIG. 3 is a perspective view showing the bottom of the electronic camera in FIG. 1.

FIG. 3 is a perspective view showing the bottom of the electronic camera 1 in FIG. 1.

An extension terminal 30 for electrically connected the electronic camera 1 to an extension unit 40, a tripod tapped-hole 32 and a unit attaching hole 34 are provided on the bottom of the electronic camera 1. The tripod tapped-hole 32 is also used as a tapped hole for fixing the extension unit 40, and the unit attaching hole 34 is L-shaped so that an L-shaped hook (see FIG. 4) of the extension unit 40 can be coupled with the unit attaching hole 34.

Figure 4:
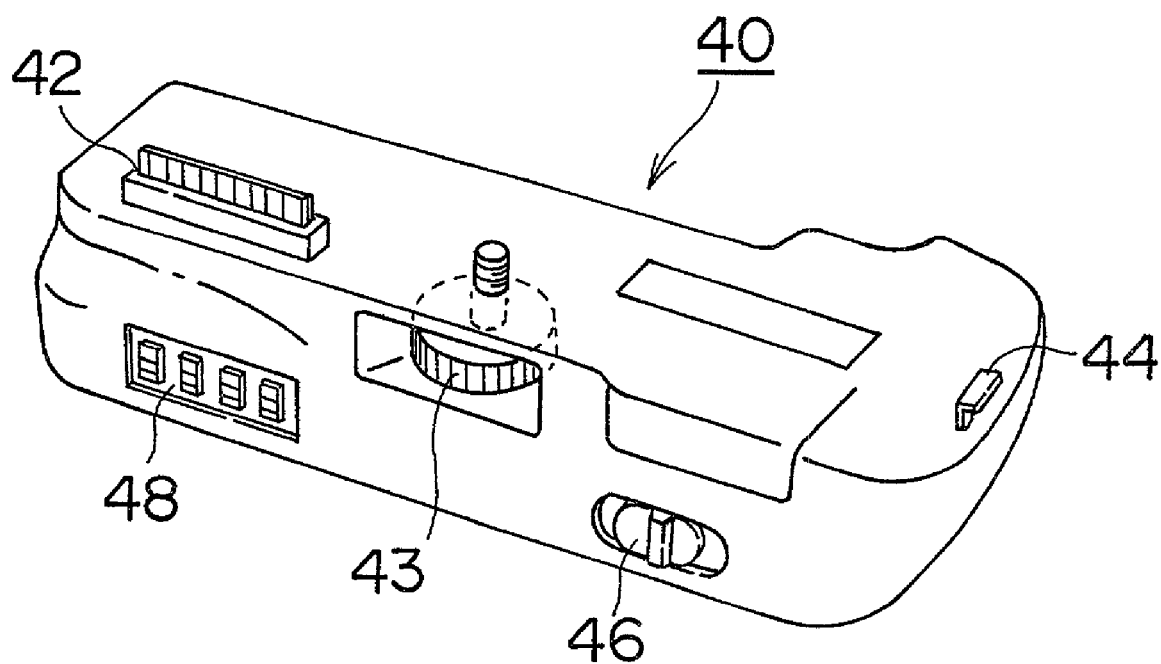
FIG. 4 is a perspective view showing an appearance of an extension unit.
Figure 6A:
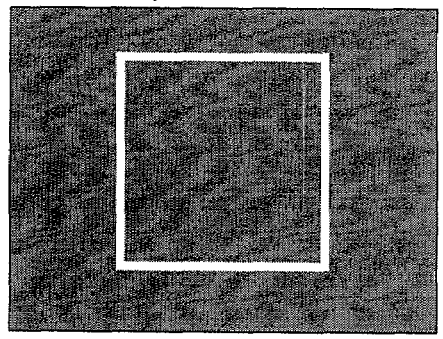
FIGS. 6(A), 6(B), 6(C) and 6(D) are diagrams showing frames of various types of identification photos displayed on a monitor.
Figure 6B:
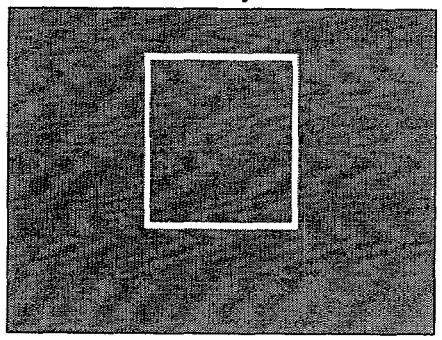
Figure 6C:
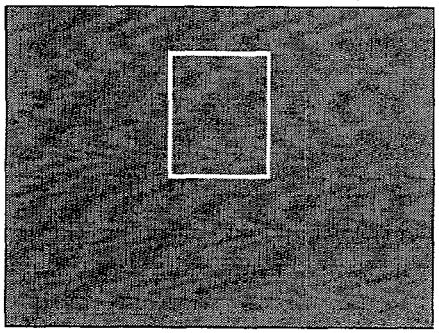
Figure 6D:
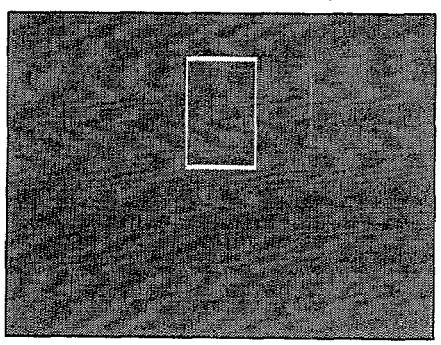

FIG. 4 is a perspective view of the extension unit 40 seen from behind attached to the bottom of the electronic camera 1 in FIG. 1.

A terminal 42 that can be coupled with the extension terminal 30 of the electronic camera 1, a fixing screw 43 and the L-shaped hook 44 are provided on the top of the extension unit 40. Coupling the hook 44 with the unit attaching hole 34 of the electronic camera 1 and engaging the fixing screw 43 with the tripod tapped-hole 32 attach the extension unit 40 to the bottom of the electronic camera 1 and electrically connect the electronic camera 1 to the extension unit 40 through the extension terminal 30 and the terminal 42.

Figure 9:
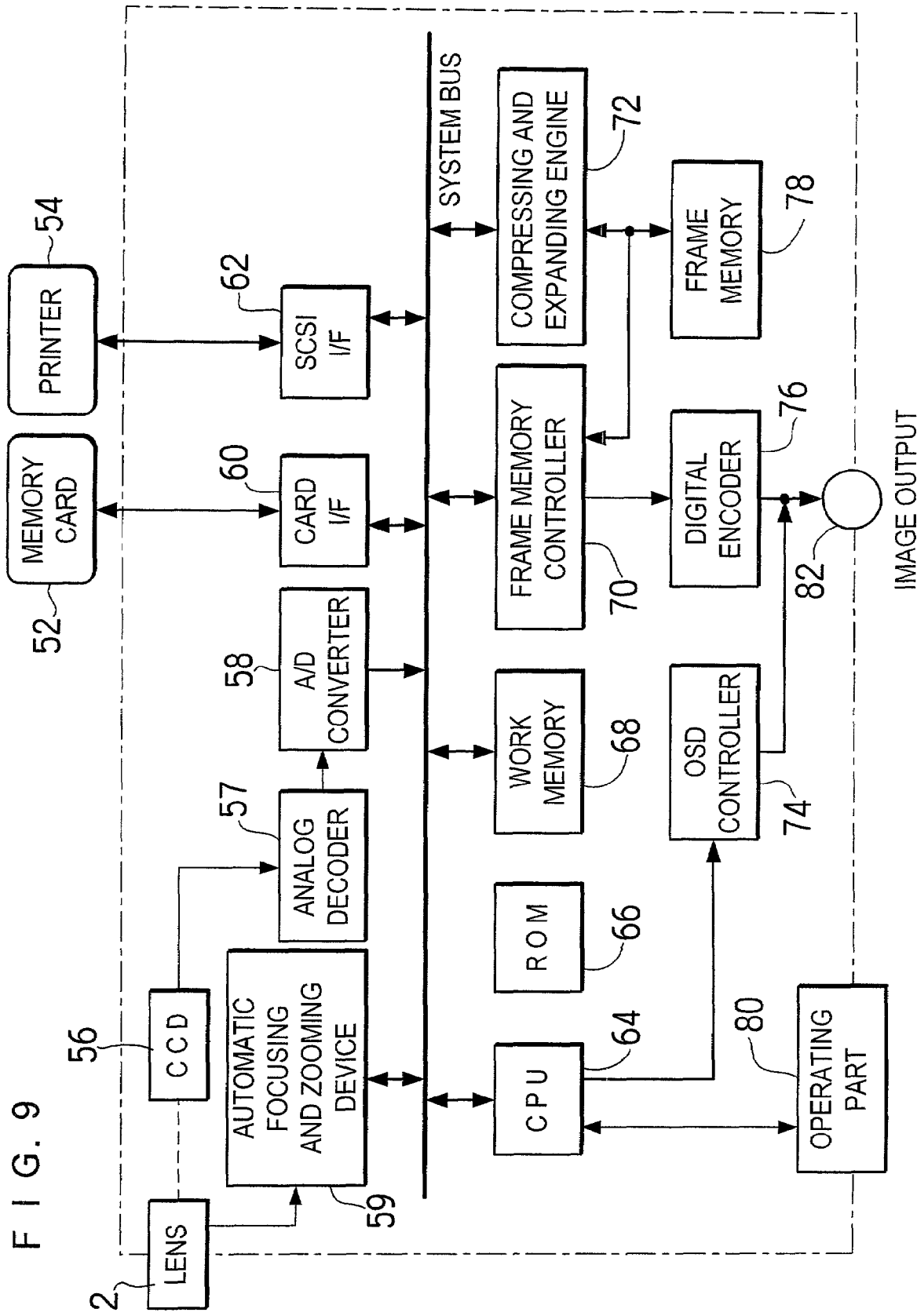
FIG. 9 is a block diagram showing the inner structure of the electronic camera.

A SCSI terminal (not shown) with 25 pins is provided on the left side of the extension unit 40, and the SCSI terminal can be connected to the personal computer or a printer 54 through a SCSI cable (see FIGS. 5 and 9).

A slide switch 46 and a dip switch 48 are provided on the back of the extension unit 40. The slide switch 46 is put between an OFF position, a SCSI position, and so on. When the slide switch 46 is at the OFF position, the electronic camera 1 enters the power-save mode to prevent a waste of the battery loaded in the electronic camera 1. At this time, the electronic camera 1 spends almost as much electricity as it does when the extension unit 40 is not attached to the electronic camera 1. When the slide switch 46 is at the SCSI position, the electronic camera 1 is effectively connected to the personal computer or the printer 54 through the SCSI terminal. Thus, the electronic camera 1 can transmit the obtained image data to the personal computer, and the personal computer can control the shooting of the electronic camera 1, and the printer 54 can print an image processed by the personal computer.

The dip switch 48 is composed of four up-and-down switches, and the combination of the states of the four switches sets a mode in the SCSI mode. When the slide switch 46 is at the SCSI position and the electronic camera 1 is in the SCSI mode, the dip switch 48 sets the PC operation mode in which the electronic camera 1 is effectively connected to the personal computer, the print mode in which the electronic camera 1 is effectively connected to the printer, or the like.

FIG. 5 is a diagram showing a system in which the extension unit 40 in FIG. 4 is attached to the electronic camera 1 in FIG. 1. The electronic camera 1 has an image output signal through which the obtained image data is outputted in a predetermined system such as the NTSC. In case the image output signal is connected to an image displaying device such as a liquid crystal view finder mounted on the accessory shoe 12, a liquid crystal monitor 50 and a TV monitor, the captured image can be displayed on the image displaying device.

The memory card 52 is loaded in the electronic camera 1, and the image data and information on the image are recorded in the memory card 52 in a predetermined format. For example, the data of the image compressed in the JPEG and index image data with 80 by 60 pixels are recorded together in the Exif format. Tag information for the image data is recorded with the image data.

The memory card 52 is a PC card or a smart media (SS-FDC) that is compatible with the PC card by a PC card adapter. The memory card 52 can be taken out of the electronic camera 1, and can be loaded in an apparatus such as a laptop computer, a PC card reader, a printer and an image processing device with a PC card slots so that the image data stored in the memory card 52 can be used with the apparatus.

The extension unit 40 attached to the bottom of the electronic camera 1 can be connected to the printer 54 through the SCSI cable. The printer 54 and the extension unit 40 communicate with each other, and the printer 54 transmits information on the type of the printer 54, size of paper and so on to the extension unit 40.

FIGS. 6(A), 6(B), 6(C) and 6(D) are diagrams showing frames of various types of identification photos displayed on the monitor. FIGS. 6(A), 6(B), 6(C) and 6(D) show the frames for a visa, a passport, a driver's license and a business card, respectively. FIG. 7 is a diagram showing the frame for the passport displayed with a captured image on the monitor.

FIG. 8 is a diagram showing display of the liquid crystal panel 13 in accordance with the operation of the size switch button 14. If the size switch button 14 (frame selecting device) is pressed when the size switching is OFF, the size switching is turned ON and the print size becomes a size A (for visa). If the size switch button 14 is pressed when the print size is the size A, the print size becomes a size B (for passport). If the size switch button 14 is pressed when the print size is the size B, the print size becomes a size C (for driver's license). If the size switch button 14 is pressed when the print size is the size C, the print size becomes a size D (for business card). If the size switch button 14 is pressed when the print size is the size D, the size switching is turned OFF. The size of the frame displayed on the monitor in FIG. 7 is changed according to the print size. The types of the identification photos are not limited to those four.

The print size for the visa is 50 by 50 mm (aspect ratio is 1 to 1), and the print size for the passport is 45 by 35 mm (aspect ratio is 9 to 7), and the print size for the driver's license is 30 by 24 mm (aspect ratio is 5 to 4), and the print size for the business card is 26 by 19 mm (aspect ratio is 26 to 19).

"A," "b," "c" and "d" displayed on the liquid crystal panel 13 shown in FIG. 8 indicate that the print size is the size A, the size B, the size C and the size D, respectively, and "2" displayed on the liquid crystal panel 13 indicates that the scene number set by the scene number switch button 24 is 2.

FIG. 9 is a block diagram showing the inner structure of the electronic camera 1.

The electronic camera 1 comprises the taking lens 2, a CCD 56, an analog decoder 57, an A/D converter, an automatic focusing and zooming device 59 that automatically focuses and zooms the taking lens 2, a card interface (I/F) 60, a SCSI interface (I/F) 62, a central processing unit (CPU) 64, a work memory 68, a frame memory controller 70, a compressing and expanding engine 72, a 72, a digital encoder 76, a frame memory 78 and an operating part 80. The SCSI I/F 62 is provided in the extension unit 40.

A subject light is formed on a light-receiving surface of the CCD 56 by the taking lens 2. The size of the CCD 56 is ⅔ by ⅔ inch, and it has 1.4 million pixels. The subject light formed on the light-receiving surface of the CCD 56 is accumulated for a predetermined time by sensors with R, G and B filters, and the subject light is converted into R, G and B signals according to the amount of the light.

The R, G and B signals are inputted to the analog decoder 57, which controls the gains and so on of the R, G and B signals. The R, G and B signals outputted from the analog decoder 57 are converted into digital signals (R, G and B data) by the A/D converter 58. Then, the R, G and B data is converted into Y/C data (luminance signals Y and chroma signals C), which is stored in the frame memory 78 through the frame memory controller 70.

When the compressing and expanding engine 72 receives a compressing command from the CPU 64, the compressing and expanding device 72 compresses the Y/C data stored in the frame memory 78 and outputs the compressed data to the memory card 52 through the card I/F 60. When the image is to be reproduced from the compressed data stored in the memory card 52, the compressing and expanding engine 72 reads and expands the compressed data, and inputs the expanded Y/C data to the frame memory 78.

The digital encoder 76 receives the Y/C data from the frame memory 78 through the frame memory controller 70, and generates color-combined image signals of the NTSC system according to the Y/C data, and outputs the image signals to an image output terminal 82.

The CPU 64 separates the image signals for the background and the image signals for the subject, and determines the size and the position of the head of the subject, and adjusts the view angle or changes the size of the image so that the subject is a predetermined size.

An on-screen device (OSD) controller 74 produces frame signals indicating the frame and character signals indicating characters and so on, and mixes the frame signals and the character signals into the image signals outputted from the digital encoder 76.

When in the print mode, the CPU 64 converts the Y/C data stored in the frame memory 78 into the R, G and B data, and stores the R, G and B data in the work memory 68. Then, the CPU 64 inputs the R, G and B data to the printer 54 through the SCSI I/F 62. A ROM 66 stores a control program and color-correction look-up tables (LUT) for types of printer.

When in the shooting and printing mode or the reproducing and printing mode that will be described later, the CPU 64 converts the Y/C data for the image in the selected frame of the Y/C data stored in the frame memory 78 into R, G and B data, and stores the R, G and B data in the work memory 68. Then, the CPU 64 adjusts the pixel number of the R, G and B data by interpolation or the like so that the print size is the size of the selected type of the identification photo, and inputs the R, G and B data for printing, the shooting information and the frame information to the printer 54.

The operation of the electronic camera 1 will now be explained.

The CPU 64 controls the electronic camera 1, and determines which mode (the shooting mode, the shooting and printing mode, the reproducing and printing mode and so on) the electronic camera 1 is in according to the operation of the operating part 80 including the shutter release button 9, the mode dial 10, the up/down dial 11, the size switch button 14 and the print button 16 to control the circuits according to the mode.

When the electronic camera 1 is in the shooting mode, the captured color image data is stored in the memory card 52. The shooting mode is set when the electronic camera 1 is in the "AUTO," "P," "S," "A" or "M" mode and the extension unit 40 is not attached to the electronic camera 1 or the slide switch 46 of the extension unit 40 is not at the SCSI position.

When the electronic camera 1 is in the shooting and printing mode, the captured image is printed by the printer 54 connected to the electronic camera 1 through the SCSI terminal. The shooting and printing mode is set when the electronic camera 1 is in the "AUTO," "P," "S," "A" or "M" mode and the SCSI mode is set by the slide switch 46 of the extension unit 40 and the print mode is set by the dip switch 48.

When the electronic camera 1 is in the reproducing and printing mode, the reproduced image is printed by the printer 54 connected to the electronic camera 1 through the SCSI terminal. The reproducing and printing mode is set when the electronic camera 1 is in the "PLAY" mode and the SCSI mode is set by the slide switch 46 of the extension unit 40 and the print mode is set by the dip switch 48.

Figure 10:
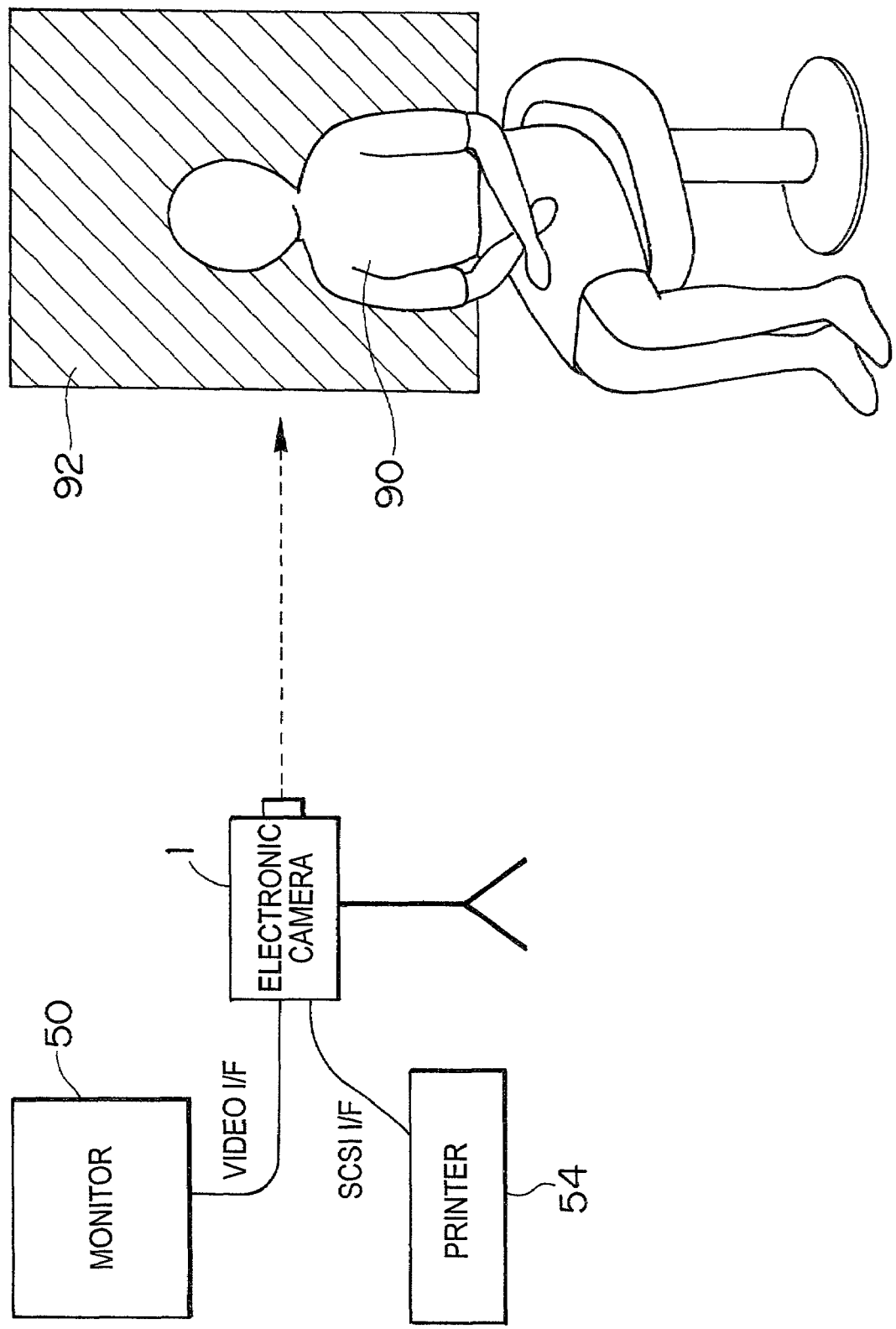
FIG. 10 is a diagram showing a method of taking the identification photo with the electronic camera.

FIG. 10 is a diagram showing a method of taking the identification photo with the electronic camera 1.

As shown in FIG. 10, the subject 90 is in front of a back plate 92, and the electronic camera 1 is connected to the printer 54 and the monitor 50.

Figure 11:
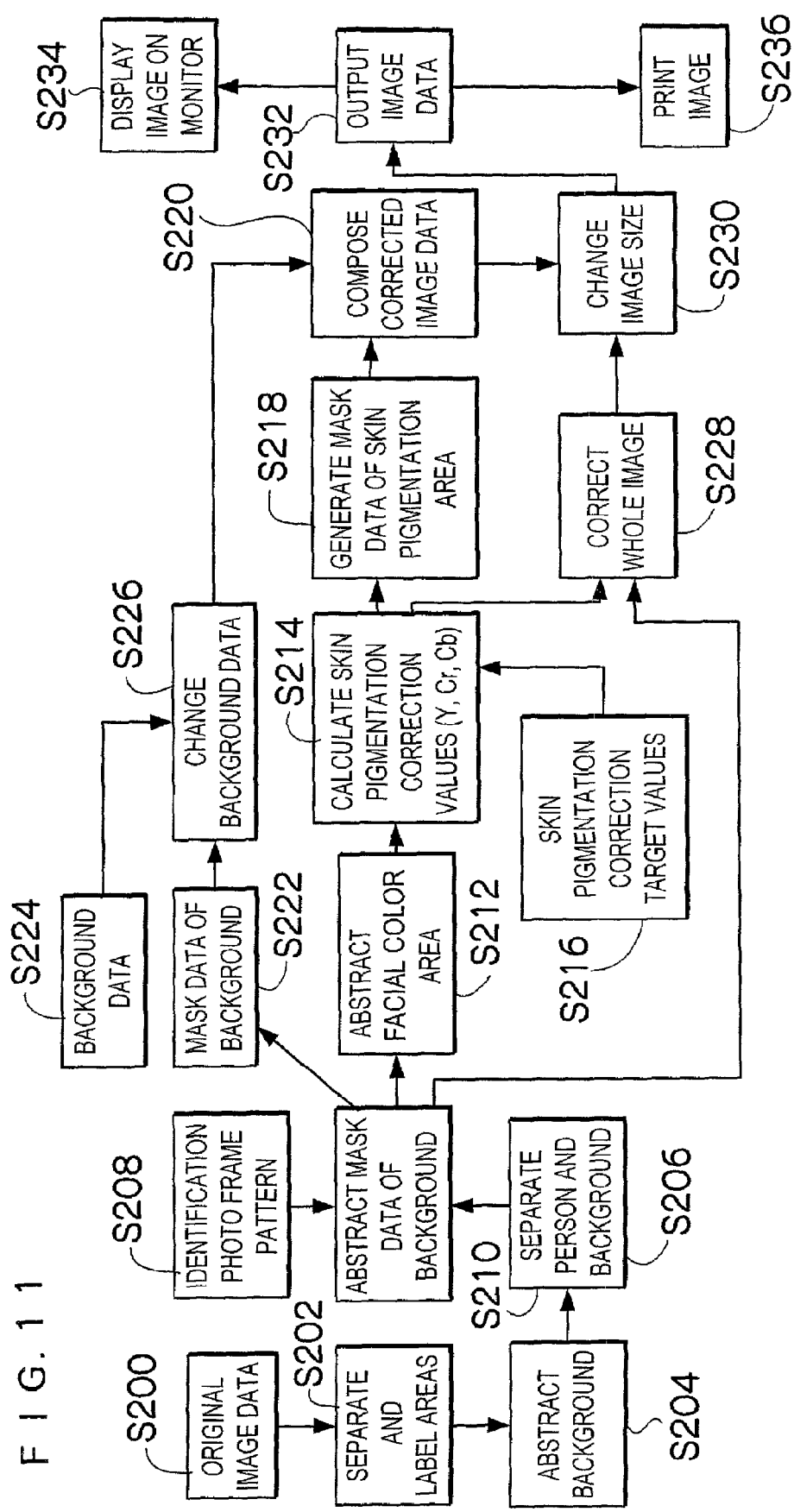
FIG. 11 is a flow chart showing image data processing.

The image processing of the CPU 64 for acquiring image data for the identification photo from the obtained image data will now be explained with reference to the flow chart of FIG. 11.

Conventionally, a shooting area and a photo size need to be set according to the type of the identification photo before the shooting. But, in the present invention, the shooting area is automatically set, and the photo size is set at the printing after the shooting. The shooting area is larger than the identification photo (50 by 50 mm) for the visa that is the largest among the identification photos, and it is 80 by 60 mm in this embodiment. If the definition of the printer is 203 dpi (8 dot/mm), the shooting area has 640 by 480 pixels.

At step 200 of "ORIGINAL IMAGE DATA," the CPU 64 reads original image data from the memory card with a memory card reader or directly obtains original image data captured by the electronic camera.

At step 202 of "SEPARATE AND LABEL AREAS," the CPU 64 separates areas and labels the areas. At step 202, in case the CPU 64 obtains luminance signals Y and chroma signals Cb and Cr of the original image data, if the difference ($\Delta Y$) between two adjoining pixels in luminance is smaller than a predetermined threshold and the difference ($\Delta C$) between the chromaticities Cb and Cr or the difference ($\Delta H$) between chromaticity angles is smaller than a predetermined threshold, the two adjoining pixels are in the same area. In case the CPU 64 obtains R, G and B signals of the original image data, the R, G and B signals are used instead of the luminance signals Y and the chroma signals Cb and Cr.

Then, the CPU 64 calculates an area (number of pixels), an average luminance Y, an average chromaticity Cb, an average chromaticity Cr, average coordinates (x, y) and so on of each area with a label.

At step 204 of "ABSTRACT BACKGROUND," an area including at least one corner of the image is the reference of the background. If an area adjoining to the reference of the background satisfies one of the conditions below, the CPU 64 considers the area as the background. The reference of the background may be the area of out an oval that is smaller than the image with its center at the center of the image. The conditions are as follows:

the difference between the average luminance, the average chromaticity Cb and the average chromaticity Cr of the area and those of the reference is smaller than predetermined thresholds, the area (number of pixels) is larger than a predetermined area Smax or smaller than a predetermined area Smin, and the average coordinates are out of a circle or an oval with its center at the center of the image.

At step 206 of "SEPARATE PERSON AND BACKGROUND," the CPU 64 considers the areas that are not the background as the person area to separate the person and the background.

At step 208 of "IDENTIFICATION PHOTO FRAME PATTERN," the CPU 64 prepares a frame pattern of a binary image indicating the desired size of the person in the desired identification photo. At step 210, the CPU 64 abstracts the person area by comparing or pattern-matching the frame pattern with the image data obtained at step 206. Alternatively, the CPU 64 defines and stores the center of the face in the frame and the width and the length of the face at step 208, and it abstracts the person area according to the values at step 210.

The CPU 64 abstracts a print area from the original image data and finds an image size changing rate for printing the desired identification photo, and abstracts mask data of the background.

At step 212 of "ABSTRACT FACIAL COLOR AREA," the CPU 64 reads (or scans) the image data and selects (picks up) the image area which is filled with specific image data that meet (satisfy) predetermined conditions to represent a facial or flesh color.

At step 214, the CPU 64 calculates an average luminance Y, an average chromaticity Cb and average chromaticity Cr of the skin pigmentation area abstracted at step 212. At step 216 of "SKIN PIGMENTATION CORRECTION TARGET VALUES," the CPU 64 compares target values of the luminance Y and the chromaticities Cb and Cr previously stored for reproducing the skin pigmentation with those of the abstracted skin pigmentation area, and set the differences or values in proportion to the differences as correction amounts. Various types of target values may be set for genders and skin pigmentation.

Non-linear correction functions may be set according to the luminance Y and the chromaticities Cb and Cr of the abstracted skin pigmentation area. Generally, the correction functions f, g and h for converting the luminance Y and the chromaticities Cb and Cr into a luminance Y' and chromaticities Cb' and Cr' are the following equations 1, 2 and 3, $$Y'=f(Y) \qquad \text{equation 1,}$$

$$Cb'=g(Y, Cb, Cr) \qquad \text{equation 2, and}$$

$$Cr'=h(Y, Cb, Cr) \qquad \text{equation 3.}$$

At step 218 of "GENERATE MASK DATA OF SKIN PIGMENTATION AREA," the CPU 64 generates mask data of the abstracted skin pigmentation area in the image data of the print area abstracted at step 210. The CPU 64 performs color correction such as color balance correction, density correction, saturation correction for the generated image data of the skin pigmentation area according to the correction amounts or the correction functions set at step 214. At step 220, the CPU 64 gives a predetermined image data value to the background according to the mask data of the background abstracted at step 210.

At step 222 of "MASK DATA OF BACKGROUND," the CPU 64 generates mask data of the background in the print area abstracted at step 210. At step 224 of "BACKGROUND DATA," the CPU 64 reads a stored color such as blue and gray for making the person stand out from the background. At step 226 of "CHANGE BACKGROUND DATA," the CPU 64 changes the colors of the background obtained at step 222 to the color read at step 224. This makes the color of the background of the identification photo even without stains to make the person stand out from the background.

Conventionally, in case the printer 54 is a thermo-auto chrome (TA) printer, a white background is covered with yellow stains and cyan green color unevenness happens on a gray background. But, in the present invention, the background can be uniformly blue.

Instead of processing the images in the skin pigmentation area and the background at steps 218 and 220, at step 228 of "CORRECT WHOLE IMAGE," the CPU 64 performs color correction for the whole image data of the print area according to the correction amounts or the correction functions set at step 214.

After step 220 or 228, at step 230 of "CHANGE IMAGE SIZE," the CPU 64 enlarges or reduces the image of the print area according to the image size changing rate found at step 210. At this time, general bilinear interpolation, three-dimensional spline interpolation (cubic spline interpolation, B-spline interpolation) or the like is used.

At step 230, the CPU 64 inserts cut guidance for the identification photo shown in FIG. 7 according to the position of the head of the person. The cut guidance may be a solid line, a broken line, marks at the corners or a combination of types of lines. The color of the cut guidance may be an additive complementary color for the color of the image, and the density in the photo area may be different from that out of the photo area, and only the photo area is color and the other area is black and white.

In addition, the shooting date is put outside the cut guidance and printed with the image. This makes it easy to determine whether or not the image was shot within the last predetermined time. Also, if information of the person such as his or her name is put outside the cut guidance, it is easy to classify identification photos of a plurality of persons.

If the user instructs the camera to print the image, at step 232 of "OUTPUT IMAGE DATA," the CPU 64 outputs the image data of the print area to the monitor 50 and the printer 54. Then, at step 234 of "DISPLAY IMAGE ON MONITOR," the monitor 50 displays the image, and at step 236 of "PRINT IMAGE," the printer 54 displays the image.

The user cuts the printed photo along the cut guidance to complete the identification photo.

Figure 12:
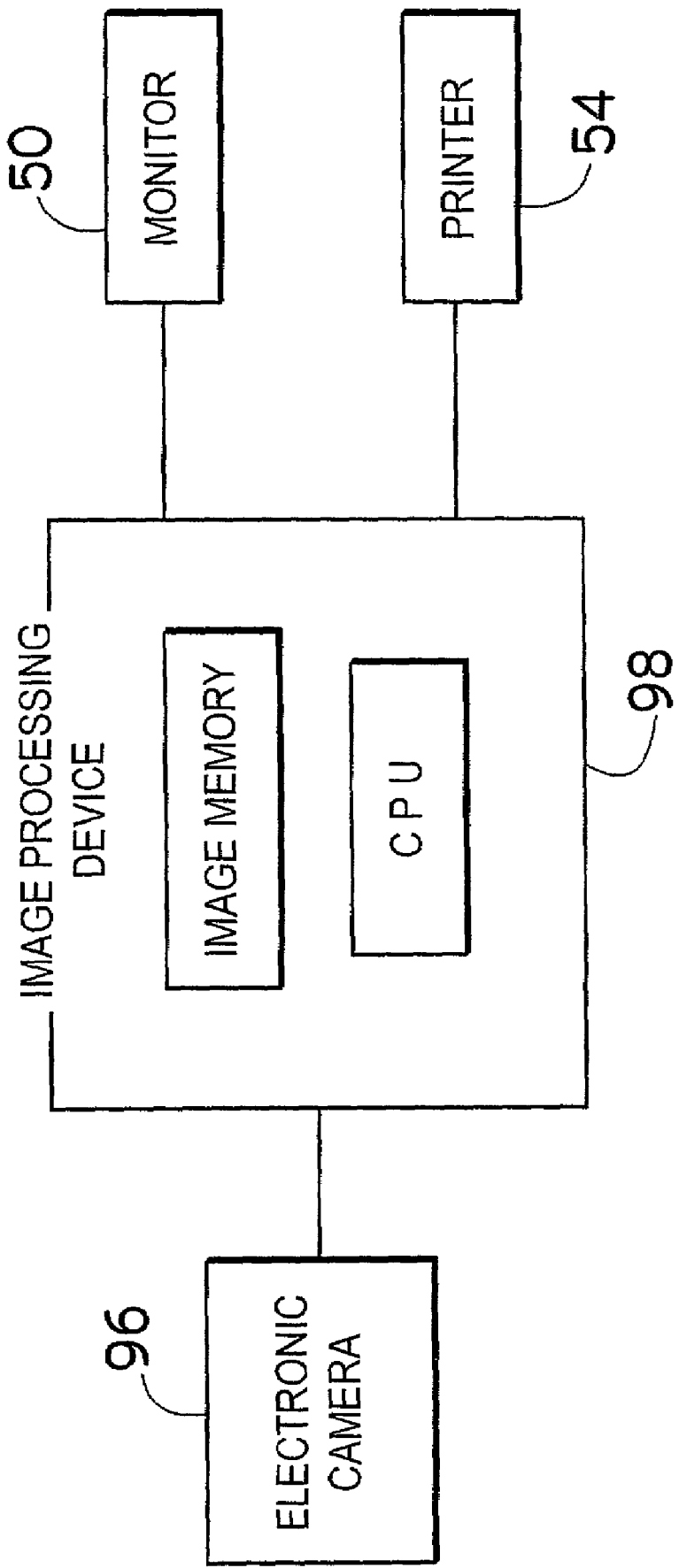
FIG. 12 is a block diagram showing another embodiment of the identification photo system.

The monitor 50 and the printer 54 can be connected to the electronic camera 1 in the embodiment, but the present invention is not limited to this. A monitor and a printer may be integrated with an electronic camera. As shown in FIG. 12, an image processing device 98 with an image memory and a CPU may perform the image processing of steps 202-232 after receiving original image data from an electronic camera 96 so that the monitor 50 displays the image and the printer 54 prints the image.

A cloth area abstracting device may abstract a cloth area of the person, and a cloth changing device may change the cloth with stored cloth patterns. For example, this makes it possible for a person in a T-shirt to obtain an identification photo in which the person wears a tie or a suit. In addition, the present invention may be applied to other types of photos. In this case, the color and style of the hair may be changed, and glasses may be added and changed.

Conventionally, only the size of the photo, the size and position of the head of the person in the photo and whether or not the photo satisfies the typical pattern conditions are regarded as important, and only whether or not the eyes of the person are open is taken into consideration, and the best one of the images is selected. The shooting is not always performed with correct exposure, and the image needs to be corrected.

In the present invention, the exposure and the color balance are corrected, and the pigmentation of the face can be true reproduced and it can be corrected so that the person looks in the best possible condition. For example, in case of a color photo attached to a personal history or an application form, whether or not the person comes out well in the photo is regarded as more important than the identification of the person. Thus, the present invention is especially effective. Also, the color of the background may be changed to blue, sky-blue, white, gray or the like for making the person stand out or by preference of the person.

In the present invention, the pigmentation of the face in the photo is corrected to the person's true pigmentation, and the image is not structurally changed when the size of the image is changed. Therefore, the identification of the person is not deteriorated.

In the present invention, the subject is the person and the image is automatically adjusted for the identification photo. But, the present invention does not limit the subject to the person.

Figure 13:
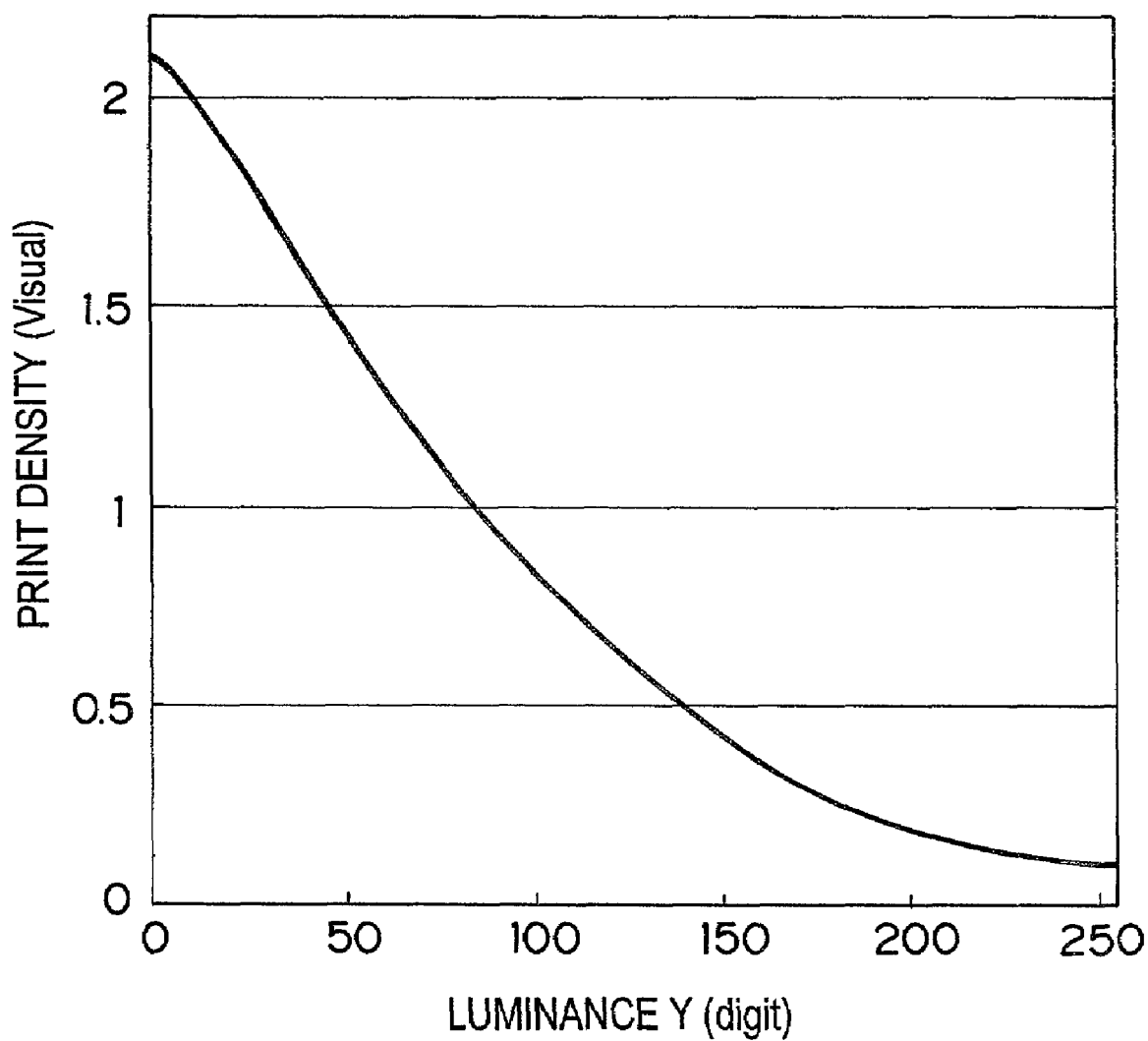
FIG. 13 is a graph diagram showing the relationship between print density and luminance.

FIG. 13 is a graph diagram showing the relationship between print density (Visual) and luminance Y (digit).

The print densities are found from the luminance signals Y obtained at the shooting with the graph in FIG. 13, and the image is printed with the print densities.

As set forth hereinabove, the identification photo system comprises the automatic correcting device that automatically corrects the image data of the person. Thus, the skin pigmentation of the person in the photo can be corrected to the person's true pigmentation.

As set forth hereinabove, the automatic correcting device comprises the skin pigmentation area abstracting device that abstracts the skin pigmentation area from the image, the skin pigmentation correction value calculating device that calculates the skin pigmentation correction values according to the colors of the skin pigmentation area abstracted by the skin pigmentation area abstracting device and the predetermined skin pigmentation correction target value, and the color correcting device that corrects the colors of the skin pigmentation area according to the skin pigmentation correction values calculated by the skin pigmentation correction value calculating device. Thus, the skin pigmentation of the person in the photo can be corrected to the person's true pigmentation.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing method, comprising:

determining a background area of an image;

determining a person area of the image as an area of the image other than the background area of the image; and sizing the image based on a size of the person area of the image such that the size of the person area is a predetermined person area size, wherein the step of determining the background area of the image comprises:

separating the image into a plurality of areas by an area separating device; and wherein the step of separating the image into the plurality of areas comprises:

comparing properties of adjoining pixels of the image; and determining that two adjoining pixels belong in the same area if the compared properties of the two adjoining pixels are less than predetermined thresholds for each property compared, and determining whether or not the each area of the plurality of areas belongs in the background area based on a comparison of the each area with a reference background area, wherein the reference background area includes at least one corner of the image, and wherein the step of determining whether or not the each area of the plurality of areas belongs in the background area based on the comparison of the each area with the reference background area includes determining that the each area belongs in the background area if a difference between an average luminance value of the pixels of the each area and an average luminance value of the reference background area is within a predetermined luminance difference threshold and a difference between an average chromaticity value of the pixels of the each area and an average chromaticity value of the reference background area is within a predetermined chromaticity difference threshold, or a difference between an average red (R) value of the pixels of the each area and an average R value of the reference background area is within a predetermined R difference threshold, a difference between an average green (G) value of the pixels of the each area and an average G value of the reference background area is within a predetermined G difference threshold and a difference between an average blue (B) value of the pixels of the each area and an average B value of the reference background area is within a predetermined B difference threshold.

2. The image processing method as defined in claim 1, wherein the properties of the adjoining pixels compared include:

luminance and chromaticity values; or red (R), green (G) and blue (B) values.

3. The image processing method as defined in claim 1, further comprising abstracting a facial area based on the person area.

4. The image processing method as defined in claim 3, wherein the step of abstracting the facial area based on the person area comprises determining that an area of the person area is the facial area when a color of the of the area is determined to be a skin pigmentation color.

5. The image processing method as defined in claim 4, further comprising correcting the facial area to a target skin pigmentation color.

6. The image processing method as defined in claim 1, further comprising:

allowing a user to select the predetermined person area size from a plurality of predetermined person area sizes prior to sizing the image, wherein in the step of sizing the image comprises sizing the image based on the selected predetermined person area size.

7. The image processing method as defined in claim 1, wherein the step of sizing the image based on the size of the person area such that the size of the person area is the predetermined size is performed after the image is generated through photography.

* * * * *